United States Patent [19]

Lewis

[11] Patent Number: 5,788,282
[45] Date of Patent: Aug. 4, 1998

[54] SAFETY BELT ADAPTOR FOR BELT ADJUSTMENT FOR VEHICLE OCCUPANTS AND METHOD OF OPERATION

[75] Inventor: Donald J. Lewis, Scottsdale, Ariz.

[73] Assignee: Universal Propulsion Company, Inc., Phoenix, Ariz.

[21] Appl. No.: 610,690

[22] Filed: Mar. 4, 1996

[51] Int. Cl.$^6$ .................................................. B60R 22/00
[52] U.S. Cl. ...................................... 280/808; 297/483
[58] Field of Search .......................... 280/801.1, 801.2, 280/808, 733; 297/468, 483

[56] References Cited

U.S. PATENT DOCUMENTS

| | | | |
|---|---|---|---|
| D. 352,591 | 11/1994 | Laney | 280/801 |
| 3,550,956 | 12/1970 | Lowe | 297/468 |
| 3,820,842 | 6/1974 | Stephenson | 280/733 |
| 3,866,940 | 2/1975 | Lewis | 280/733 |
| 4,098,524 | 7/1978 | Ardizio | 280/808 |
| 4,236,755 | 12/1980 | Pollitt et al. | 297/483 |
| 4,289,352 | 9/1981 | Ashworth | 297/483 |
| 4,319,769 | 3/1982 | Compeau et al. | 280/808 |
| 4,466,666 | 8/1984 | Takada | 297/468 |
| 4,486,031 | 12/1984 | Holler et al. | 280/802 |
| 4,583,762 | 4/1986 | Carlstedt | 280/807 |
| 4,609,205 | 9/1986 | McKever | 280/808 |
| 4,758,048 | 7/1988 | Shuman | 297/468 |
| 4,796,919 | 1/1989 | Linden | 280/808 |
| 4,832,367 | 5/1989 | Lisenby | 280/808 |
| 4,938,535 | 7/1990 | Condon et al. | 280/808 |
| 4,946,198 | 8/1990 | Pittore et al. | 280/808 |
| 5,215,333 | 6/1993 | Knight | 280/808 |
| 5,248,187 | 9/1993 | Harrison | 297/482 |
| 5,472,236 | 12/1995 | Gray | 280/808 |

*Primary Examiner*—Paul N. Dickson
*Attorney, Agent, or Firm*—Pennie & Edmonds LLP

[57] ABSTRACT

A safety belt system with a lap portion and a shoulder portion which shoulder portion extends upwardly at an angle from a location on the lap belt portion, and more particularly a belt system including a shoulder belt angle determinant or adaptor component and the method of using the angle determinant or adaptor to improve such belt system. The adaptor component of the belt which when installed in the belt system relocates the position from which the shoulder belt portion extends upwardly to and in engagement with an upper vehicle anchor. By varying the length of the adaptor component the angle at which the shoulder belt section is located is varied to accommodate vehicle occupants of different sizes including children. The angle and position of the shoulder belt is selected to properly place the shoulder belt across the occupant's torso.

10 Claims, 3 Drawing Sheets

5,788,282

1

SAFETY BELT ADAPTOR FOR BELT ADJUSTMENT FOR VEHICLE OCCUPANTS AND METHOD OF OPERATION

FIELD OF INVENTION

This invention relates to safety devices for vehicle occupants and more particularly to inflatable belt systems adaptable to serve vehicle occupants of various sizes.

BACKGROUND OF THE INVENTION

Vehicle safety belts including a shoulder (or torso) component, whether unitary or having multiple sections, have in the past presented the problem that when the system has been installed or "buckled up" the shoulder portion which has a fixed length and angle of repose is positioned at different locations across, below or above an occupant's torso, neck and head depending on the size of the upper body of the seated occupant. If the shoulder belt is in front of or across the occupant's neck it can chafe or irritate and if in front of the head it can obstruct the occupant's vision.

Numerous proposals for varying the location of the shoulder belt and particularly the angle between the lap belt portion and shoulder belt portion of which vehicle safety belts have been proposed using various auxiliary straps (i.e. U.S. Pat. Nos. 4,946,198, 4,938,535, and 4,832,367). It has also been proposed to lower the effective location of the post anchorage support of a unitary belt which anchorage support engages the upper end of the diagonally positioned shoulder portion of the belt (U.S. Pat. No. 4,796,919).

Such prior proposals have drawbacks including the difficulty of positioning and subsequent adjustment of auxiliary straps and bands and, in particular, these prior art devices are inapplicable for use with inflatable belt systems. Inflatable belt systems require that the entire shoulder portion be rapidly inflated when a collision occurs. Auxiliary straps and bands positioned on or attached to the shoulder belt portion present the difficulty of interfering or restricting with shoulder belt inflation. For example, if the seat belt adjustment band 10 of U.S. Pat. No. 5,215,333 were attempted to be used on an inflatable shoulder belt, band 10 located centrally in the shoulder belt portion would restrict shoulder belt 12 inflation. Inflation would be arrested at the point where band 10 is attached to shoulder belt 12 allowing only a portion of the shoulder belt to inflate.

None of these prior proposals provide an adequate belt system which is simple, economic and easily usable by occupants who vary in sizes from large men to small children. Further, such prior proposals interfere with proper operation of inflatable belt systems.

SUMMARY OF THE INVENTION

Seat belt devices to secure vehicular occupants in their seats in general use today include multiple section belts and unitary belts. These belt systems may be inflatable or non-inflatable.

Unitary belt systems include shoulder and lap portions, each portion of which has one or more ends secured to a vehicle-mounted anchor. All these types of seat belts are designed to restrain an occupant in his seat during a collision by limiting the forward motion of the occupant with respect to his seat as a result of the collision. When non-inflatable fabric or webbing belts are used, the wearer occupant moves forward and impacts against the seat belt webbing which thereafter restrains him against further forward motion. This invention is directed to inflatable and non-inflatable belts; however, the preferred embodiments employ inflatable belts which when inflated expand radially to enlarged diameters. At the same time inflatable belts shorten or contract longitudinally. The longitudinal contraction occurs because a portion of the seat belt length is being expanded radially to form the inflated tube. This contraction tightens both the shoulder belt portion and the lap webbing by drawing it through the pivotal slotted tongue unit belt to press the wearer in a backward direction against the seat back.

The expanding force of the inflating seat belt also serves to press the wearer rearwardly against the back of his or her seat. Inflatable belts expand in a very short period of time after a collision (e.g., on the order of about 5 to 15 milliseconds) before any substantial forward motion of the wearer occupant with respect to his seat. Thus, the relative velocity between the wearer and his or her seat is zero or close to zero. Belt inflation occurs before the wearer is forced forward away from his or her seat any substantial distance. In this manner, the wearer is already snug against or pressed against the inflated seat belt and is being restrained thereby when the collision or deceleration forces act on him and move him forward in relation to his seat. Therefore, the wearer does not impact against the belt but instead the belt impacts the wearer. With the inflated seat belt bearing against the wearer, he or she can "ride down" the crash forces of a collision by utilizing the crash absorbing characteristics of the vehicle itself, with a considerable amount of his or her energy being absorbed by the gases within the seat belt.

Broadly, the present invention is a method and apparatus for selectively diagonally positioning the inflatable or non-inflatable shoulder belt component of a lap/shoulder belt system when the belt system is placed in operable position by the occupant upon entering the vehicle and prior to its operation. Selective diagonal positioning of the shoulder belt component is accomplished by changing the location of the point from which the shoulder belt portion extends upwardly from the lap portion of the belt to the upper vehicle anchor location.

The invention includes use of an adaptor belt section or shoulder angle determining section which may be added to an existing belt system or built into a factory installed belt system. The shoulder angle determining belt section functions to split the lap belt portion of the system into two functional components. The first component is the belt portion from the belt retractor located on one side of the seat to the shoulder base locator or belt diverter unit from which the shoulder belt portion arises to diagonally cross the wearer bodies including torsos including their sternums. The second lap belt component is the shoulder angle determining section which section, as installed, extends from such locator or belt diverter unit to the belt retainer located on the other side of the seat. Since the shoulder portion of the belt system arises from the shoulder base locator (or belt diverter unit), the position of such locator or belt diverter unit determines the shoulder belt location and angle vis-a-vis the wearer. By effectively locating the shoulder base locator or belt diverter unit in a position more central to the wearer occupant's torso, the diagonal angle of the shoulder belt is shifted to a more vertical or upright position. Such shifting of the shoulder belt portion as it arises from the locator or buckle diverter unit permits meeting the needs of smaller occupants as will be described further. In unitary belt systems the belt passes through a slot with or without a friction reducing element such as a roller or coated surface in the locator or buckle diverter unit and arises from the slot to form the shoulder belt portion. The present invention is also useful in belt systems where shoulder portions are attached to the lap portion using known buckles.

The invention is useful for accomplishing belt adjustment for each individual occupant as he or she first sits in the vehicle seat with the belt system. Adjustment is effected by varying the length of the shoulder angle determining section or by substituting one angle determining section for another section of different length.

DESCRIPTION OF THE PREFERRED EMBODIMENT

Figure 1:
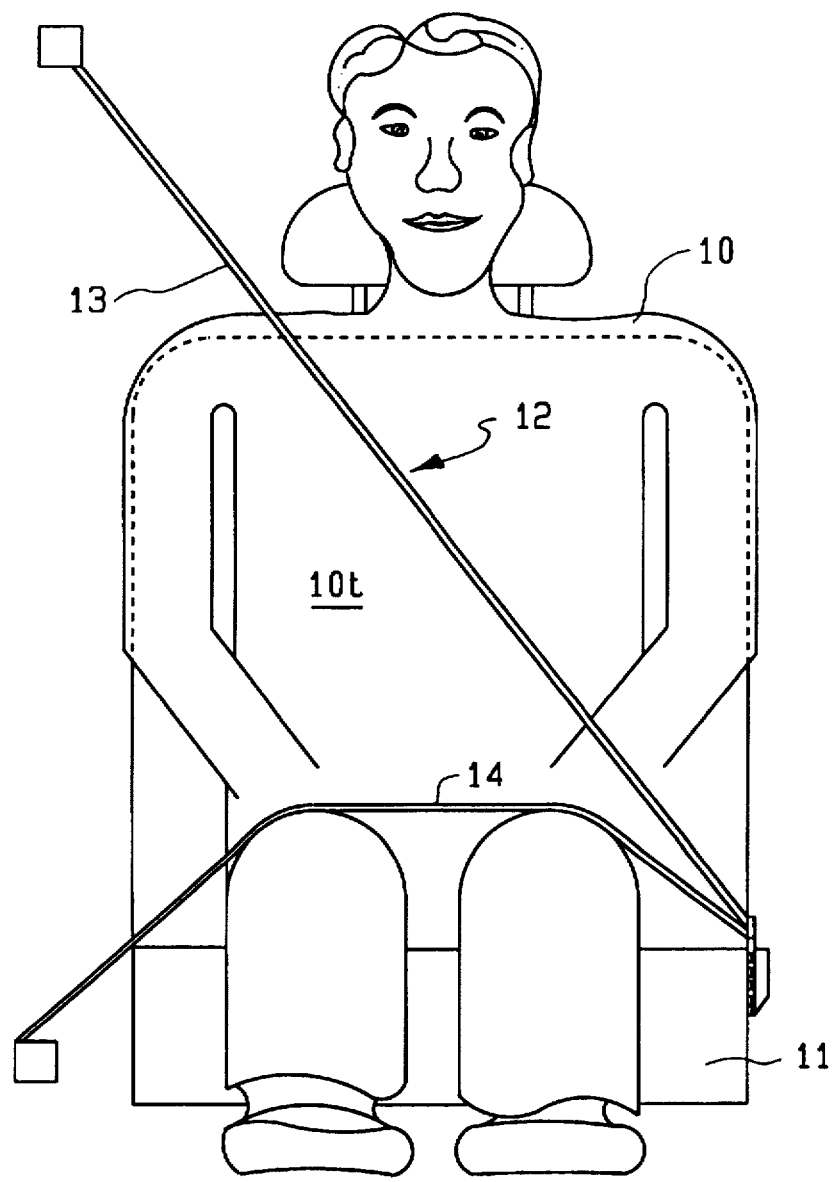
FIG. 1 is a prior art automobile restraint system protecting a average sized occupant.
Figure 2:
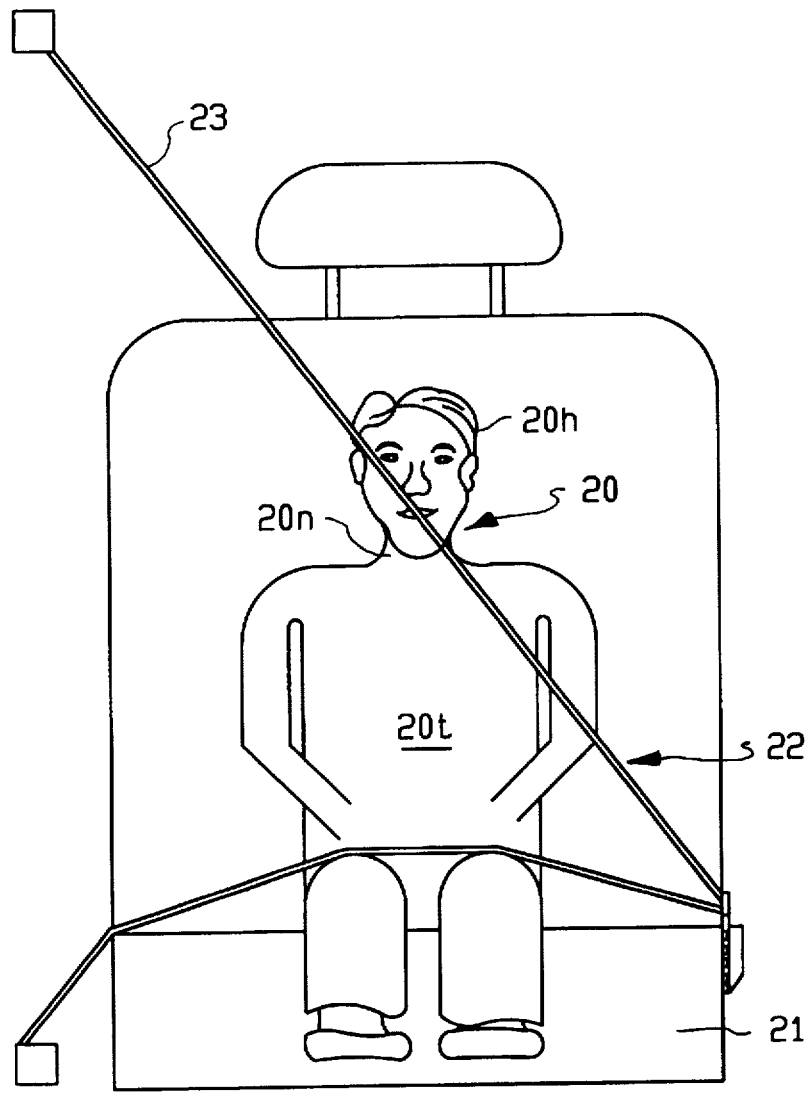
FIG. 2 is a prior art restraint system positioned to protect a small person as an occupant.

In FIGS. 1 and 2, it is seen that prior art restraint systems have caused the shoulder belt portion of an auto safety belt to be positioned at different locations with respect to the occupant depending on the size of the occupant. FIG. 1 illustrates an average size occupant 10 seated in seat 11 with safety belt 12 positioned to effect restraint in the event of a collision. Shoulder belt portion 13 is positioned in front of and diagonally across the torso 10t of occupant 10 with lap belt portion 14 across the occupant's 10 lap. As can be seen in this Figure, the shoulder belt is across the torso and is not positioned to chafe the wearer or to interfere with vision. FIG. 2 illustrates the use of a standard size system with a small occupant 20 seated in seat 21 with safety belt 22 connected for restraint. Shoulder belt portion 23 is positioned diagonally partially across a portion of the occupant's 20 torso 20t and also across the head 20h and neck 20n.

The passive restraint system of the present invention includes modifying or adapting prior art belt systems which include shoulder and lap belt portions so that the shoulder belt portion, whether inflatable or not, emanates for a selected location on the lap belt portion to cause the shoulder portion to be positioned as desired with respect to the occupant's torso. While the invention is preferably used by adapting unitary belt systems in which the shoulder portion and lap portion include one continuous piece of belting, the present invention can be used to enhance any shoulder lap belt system.

Figure 3:
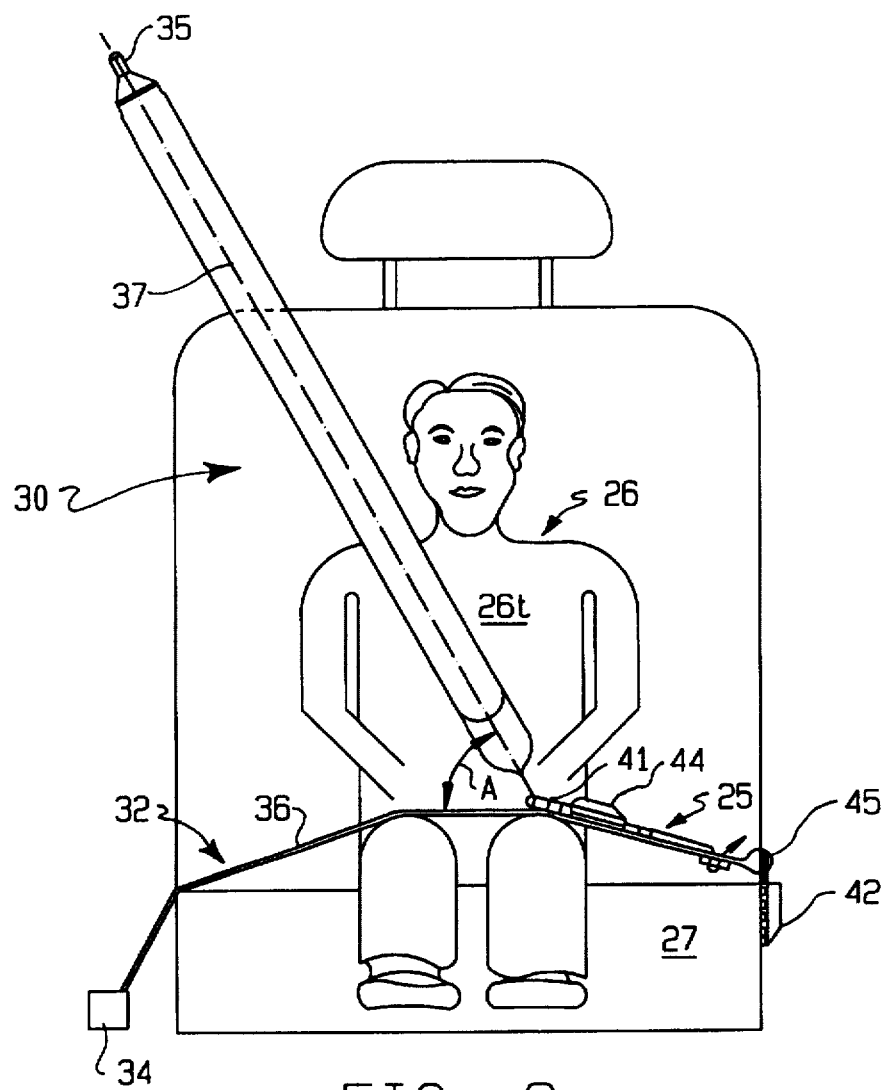
FIG. 3 is a front elevational view of the restraint system of the present invention used by a small occupant including the novel adjustable belt adaptor component.
Figure 4:
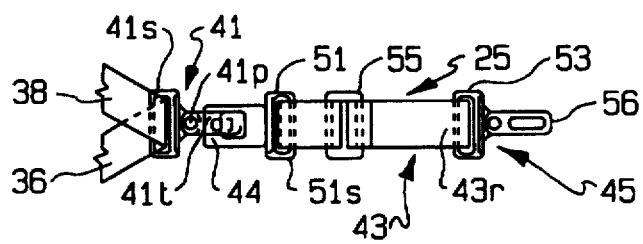
FIG. 4 is a plan view of the belt adaptor component with end connectors.
Figure 5:
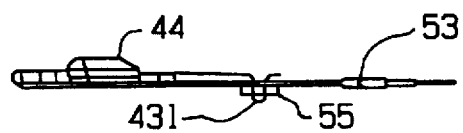
FIG. 5 is a side elevational view of the belt adaptor component.

A preferred embodiment of the invention is shown in FIGS. 3–5, in which adaptor or angle-determining component 25 has been added to a well-known unitary safety belt arrangement having shoulder and lap belt portions. Turning in particular to FIG. 3, the inventive system is shown restraining a small occupant 26. The inventive system is particularly designed for collision restraint of smaller occupants but may be used with any sized occupant. Small occupant 26 is seated in vehicle seat 27 protected by safety belt system 30 which includes unitary belt 32 a portion of which exits from retractor anchor 34, passes slidingly through slot 41s in a belt slotted tongue or D-ring unit 41 of end unit 44 and rises upwardly at angle A to upper post anchor 35 where it is secured (FIG. 3). Unit 41 includes an angle accommodating pivot 41p. Retractor anchor 34 preferably operates responsive to a vehicle inertia sensor to prevent the lap belt portion from being extended upon the occurrence of a collision involving the vehicle. Belt 32 includes lap belt portion 36 and shoulder belt portion 37. Shoulder belt portion 37 is inflatable by an inflator unit (not shown). Any suitable inflator unit known to the art may be used. As will be further discussed use of adaptor or angle-determining component 25 enables the shoulder belt portion 37 to be located so it is diagonally positioned across occupant's 26 torso 26t without causing irritation to wearers or interfering with their sight.

Turning to FIGS. 4 and 5, adaptor component 25 has a central belt portion 43 and two (2) connector end units 44, 45. Central belt portion 43, made of belt fabric or webbing, and component end units 44, 45, together determine the length of adaptor component 25.

With particular reference to FIG. 3, tongue unit 41 including tongue 41t and pivot pin 41p is releasably connectable with adaptor left end connector 44. End connector 44 includes adaptor loop 51 with slot 51s for receiving the adaptor belt central portion 43. Belt portion 43 has right end portion 43r secured to loop 53 of right end connector 45. Belt portion 43 passes through loop 51 and its left end portion 43l is secured to loop piece 55. End connector 45 includes tongue 56 for insertion into vehicle anchor retainer 42. A suitable spring loaded release mechanism in connector 44 permits the occupant to readily disconnect vehicle adaptor component 25 from belt 32. By adjusting the length of adaptor component 25 the wearer can vary the location of slotted tongue 41 from which shoulder belt portion 37 emanates and thereby vary angle A of the shoulder belt portion to accommodate for their size to achieve safety, comfort, or for other reasons (see FIG. 3).

In operation of the invention, occupant 26 take his or her place on the vehicle seat 27. Depending on the size of the occupant, or preference of the occupant, an adaptor component 25 is connected between the retainer anchor 42 and slotted tongue unit 41. Thereafter, the occupant adjusts the length of adaptor component 25 by manipulating central belt portion 43 including threading it through adjustment loop piece 55. Alternatively, instead of using one adjustable adaptor component for each vehicle seat, a plurality of adaptors each of differing lengths can be made available to occupants of a vehicle. Each occupant or his or her assistant can then select from the group of adaptor components for installation into belt system 30.

In the practice of the invention, a selected or designated seat in a vehicle may be customized to fit a particular occupant who normally occupies that seat. The occupant who will occupy the seat, for example a child, sits in the seat and an adjustable or non-adjustable belt connector is then connected into the belt system as described above. If a non-adjustable belt adaptor is being used, an adaptor component of selected length is installed to provide proper fit for the child occupant. If an adjustable connector is used, the adaptor length is adjusted until the shoulder portion is oriented in the proper place at the proper angle. The belt system is now ready for disconnecting and reconnecting for the child occupant without further installation or adjustment. Thereafter, when the child next occupies such seat, he or she or the assisting person need only draw the belt including its adaptor down and across the child's body and cause the adaptor end to engage in the retainer.

While various embodiments of my invention have been described, it is understood that various modifications and changes can be made in such embodiments including both apparatus and the methods without departing from the spirit of my invention or the scope of the following claims:

I claim:

1. A safety belt system including a lap belt portion and a shoulder belt portion which extends upwardly at an angle from a lower position on the lap belt portion to a higher position on a first vehicle-mounted anchor which system protects a vehicle occupant having a lap and a torso comprising:
   a) lap belt means extending from a second vehicle-mounted anchor over the occupant's lap to a third vehicle-mounted anchor;
   b) shoulder belt portion locating means on the lap belt means for locating the position from which the shoulder belt portion extends upwardly;
   c) said lap belt means having a first lap belt portion of selected length on one side of such shoulder belt portion locating means and a second lap belt portion of selected length on the other side of such locating means, the lap belt portion lengths being selected so that the shoulder belt portion locating means is positioned to in turn locate the shoulder belt portion central to the torso of the vehicle occupant;
   d) adjustment means for varying the length of one of the lap belt portions whereby the shoulder belt portion locating means is positionable to vary the location from which the shoulder belt portion extends upwardly across the occupant's torso to the first vehicle-mounted anchor.

2. The safety belt of claim 1 in which the shoulder belt portion is inflatable.

3. The safety belt system of claim 1 in which the shoulder belt means and a portion of the lap belt means are unitary.

4. The safety belt system of claim 3 in which the shoulder belt portion locating means includes an opening and in which the shoulder belt portion arises from such opening.

5. The safety belt system of claim 1 in which the adjustment means is adjustable to locate the shoulder belt portion locating means to a position central to the torso of vehicle occupants of varying sizes.

6. The safety belt system of claim 1 in which the adjustment means is further adjustable to locate the shoulder belt portion in selective diagonal positioning across the sternum of vehicle occupants of varying sizes.

7. In a method of restraining a vehicular occupant using a safety belt having a connector member normally connectable to a vehicle-mounted retainer anchor, having a lap portion, a shoulder belt angle-determining connector member in the lap portion, a shoulder belt portion extending upwardly from such shoulder belt angle determining connector member in which the position angle of the shoulder belt portion with respect to the occupant is determined in part by the position of such connector member, the improvement comprising:

a) introducing into the safety belt an additional section of belt having a central portion and two end coupling means, said step of introducing accomplished by;
      i) connecting the shoulder belt angle determining connector member to one of the end coupling means of such additional section; and
      ii) connecting the other of the end coupling means of such additional section to the vehicle retainer anchor; and
   b) adjusting the length of the additional section belt such that the shoulder belt portion is positioned central to the torso of the vehicle occupant.

8. The method of claim 7 in which the safety belt is inflatable.

9. The method of claim 7 in which the shoulder portion is inflatable.

10. The method of claim 7 in which the additional section includes adjustment means for varying its length and having the additional step of varying the length of such section by operating such adjustment means.

* * * * *